March 17, 1970 D. SILVERMAN 3,500,819
MEDICAL PROBE ADAPTED TO BE EVERTED UNDER PRESSURE AND METHOD
Filed Oct. 24, 1965 3 Sheets-Sheet 3
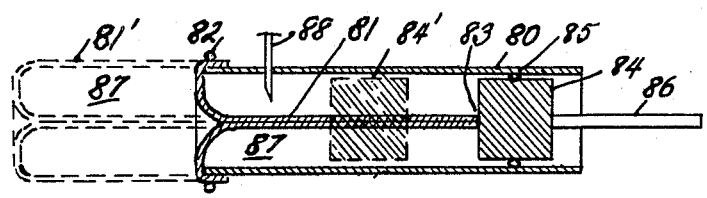
FIG. 8
FIG. 9
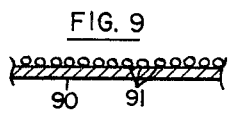
FIG. 10
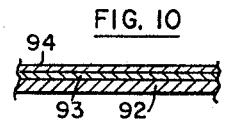
FIG. 11
*Daniel Silverman*
INVENTOR United States Patent Office 3,500,819
Patented Mar. 17, 1970

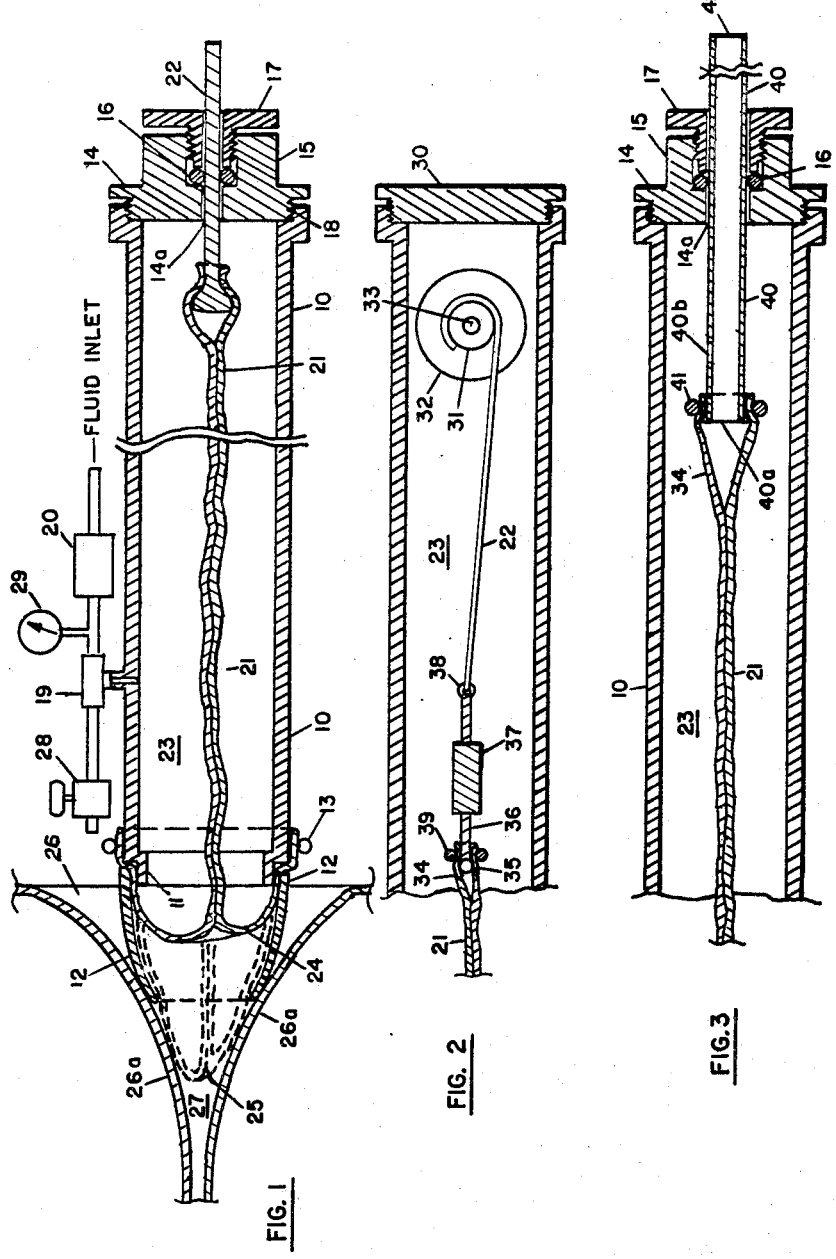

3,500,819
MEDICAL PROBE ADAPTED TO BE EVERTED
UNDER PRESSURE AND METHOD
Daniel Silverman, 5969 S. Birmingham,
Tulsa, Okla. 74105
Filed Oct. 24, 1965, Ser. No. 504,815
The portion of the term of the patent subsequent to
Feb. 2, 1982, has been disclaimed
Int. Cl. A61b 10/00; A61j 1/00
U.S. Cl. 128—1.2                     23 Claims

ABSTRACT OF THE DISCLOSURE

This invention is directed to a medical instrument comprising a non-eversible tube, an elongated, flexible, eversible tubing inside the tube. One end of the tubing is closed, the other end is sealed circumferentially over a first end of the tube. Non-deformable, cylindrical, fluid-displacing means is inserted and sealed into the second end of the tube. The tube is filled with fluid. Then when the fluid-displacing means is pushed farther into the tube by means external to the tube, fluid in the tube will be displaced out through the first end, causing the tubing to be everted. When the fluid-displacing means is withdrawn, fluid will be withdrawn from the everted tubing back into the tube, causing the tubing to be inverted back into the tube.

---

This invention relates to the art of medical instruments in general and to those instruments which are concerned with the inspection of, sampling of contents from, and the treatment of the walls of internal body cavities, particularly those of great linear extent, and those which are nonlinear and have many bends and turns. However, it can be used in the exploration of cavities, pipes and openings of all types, sizes, shapes, and dimensions.

There are a number of medical instruments available for the probing and inspection of internal body cavities, such as the nose and throat passages, and many tubular conduits, the sampling of contents from such cavities and the placement of medical treating devices therein. These instruments are generally of the rigid mechanical type that require either spreading of the walls of the cavity or the lubrication into such cavities of tubular metallic devices through which, after they are in place, additional instruments can be inserted.

The insertion of these instruments causes pressure and friction along the walls of the cavity, causing pain and discomfort, as well as injury to the tissues. It is thus an object of my invention to provide a method and apparatus for the introduction of medical apparatus into a body cavity without sliding frictional contact with the walls of the cavity and without injury to the tissues. It is a further objective to provide a thin-walled plastic tubular liner, or a thick-walled flexible tubing, introduced into said cavity, through which additional instruments can be introduced into the body cavity and through which samples of the contents of the cavity can be withdrawn. It is a further objective to provide means to contact the walls of an internal body cavity by means of a thin flexible tubular means backed by fluid pressure, to exert a pressure, to chemically or by irradiation treat the walls of said cavity, or to sample, by attachment to said means, the materials on the walls of said cavity.

In principle, my invention comprises a closed housing or container having at one end a tubular projection of a diameter smaller than the cavity diameter, and generally of the approximate diameter of the thin-walled flexible tube to be placed inside of the cavity. A length of thin-walled flexible tubing with one end closed is placed inside the container (closed end first) through the tubular projection. The open end of the tubing is placed over the tubular projection of the container and clamped in pressure tight relation thereto. Means for introducing a gas or liquid under pressure inside the container is provided. This fluid pressure forces the tubing to be ejected out of the container through the tubular opening—being turned inside out as it goes. The internal fluid pressure enables the tubing to exert a pressure on the walls of the cavity to separate them and permit the tubing to be extruded and "grow" in length.

The tubing can be retrieved by being physically withdrawn from the cavity, but preferably, it can be withdrawn by providing a cord or other tension member attached to the closed end inside the container, and to withdraw or wind up the cord by appropriate means, retrieving the tubing, all the while maintaining fluid pressure inside the tubing, by a procedure which is the direct reverse of the insertion process.

As will be explained below, as the tubing is being extruded from the container, the closed end of the tubing can be used to "pull into" the cavity inside of the tubing, sliding along the inside surface of the tubing, instruments of different types, or to pull in a flexible, small bore rigid-walled tubing through which fluids can be sampled from the cavity, or probes can be introduced. By coating the outside of the thin-walled tubing (the inside of tubing before insertion) with chemical treating materials, direct or indirect contact of the walls of the cavity can be effected. By coating the outside of the tubing with adhesive or other materials, samples of the fluids or materials on the walls of the cavity can be obtained.

Briefly described, the invention utilizes a fluid-confining chamber having circumferential side walls, one end wall being adapted to be placed in communication with the cavity; and another portion of the chamber permits the introduction and/or the retrieval of a thin-walled flexible inelastic tubing which is introduced into the cavity by a progressive rolling in and a retrogressive peeling off of the extraverted probe tube.

A length of such tubing comprising the probe has one end closed which is initially placed within the casing at a point remote from the cavity it is to enter. An open end of the flexible tubing is secured to the leading end of the casing, the tubing comprising an end closure of the casing and being extendible therefrom by eversion.

Means for introducing a fluid within the casing and about the flexible tubing stored therein is provided and such fluid displaces the tubing progressively from the casing by extraverting the lead end.

Thus, the collapsible thin walled flexible tubing is progressively extraverted and projected from the casing by a rolling action into and peeled from the cavity as pressure and/or displacement fluid is applied to or withdrawn from the annulus between the collapsed tubing and the peripheral casing wall. A means is provided for maintaining the displacing fluid within the casing under the selected pressure and this can include both flow control and pressure indicator means.

As will become apparent, as the tubing is being extraverted/extruded, the trailing collapsed end of the flexible tubing may be linked, not only to a retrieving means, but may transport into the cavity and within the extraverting tubing a wide selection of instruments which may sample, inspect and/or treat the areas within and adjacent the cavity. The collapsed tubing within the casing may contain medicating and/or opaquing materials which are brought indirect contact with the walls of the cavity. Also the tubing may be assimilable or of delayed solubility.

These and other new and novel uses, benefits, and objectives of my invention will be more clearly described and understood in connection with the attached drawings, in which:

FIGURE 1 is a cross sectional view of one embodiment of my invention showing its general construction and mode of operation.

FIGURE 2 is a partial cross section showing an embodiment adapted to facilitate the introduction of medical treating devices.

FIGURE 3 is a partial cross section showing another embodiment adapted to facilitate the introduction of a tube through which fluids can be sampled from the cavity and through which probe devices can be introduced into the cavity.

FIGURE 8 illustrates another embodiment of the everting priciple involving the use of a piston in a first sleeve to force the transfer of fluid from the first sleeve to a second sleeve to cause the second sleeve to evert.

FIGURES 9, 10 and 11 illustrate other embodiments in which the material of which the sleeve probe is made may be modified to provide particular advantages in the use of this invention.

Figure 4:
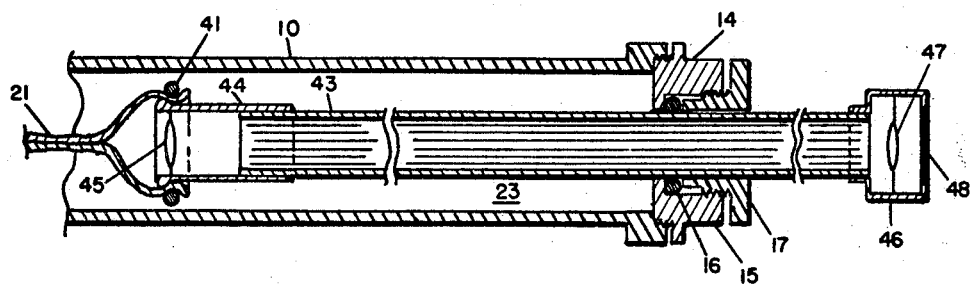
FIGURE 4 is a partial cross section showing another embodiment including an optical viewing instrument for exploring the cavity.

In FIGURE 1, I show one embodiment of this invention, which has an elongated cylindrical body, chamber or casing 10, preferably made of metal or plastic or the like. However, it need not be a perfectly rigid structure, but may have a certain amount of flexibility. This body has at one end a cylindrical lip 11 over whch fits a nose piece 12 of smooth tapered cylindrical shape. At the other end, the body carries a cap or end piece 14 which is attached in fluid tight engagement by means such as the threads 18. This cap 14 contains a central opening 14a and a packing gland 15 including deformable packing ring 16 and pressure nut 17. By adjustment of the nut 17, fluid tight seal can be made to a smooth cylindrical surface such as that of cord 22, or rod or tube 40 of FIGURE 3, as desired. Different end caps 14 can be provided with different size openings and packing glands to accommodate different size linear cylindrical elements passing therethrough.

Inside the body 10 is a long thin-walled plastic tubing 21 which is attached at one end to the cord 22. At its other end it is expanded and slipped over the lip 11 where it is securely clamped in fluid tight seal by means of the nose piece 12 and the ring 13. Attached to the wall of the body is a side tube 19 opening into the interior of the body. The tube 19 communicates to a pump 20 by means of which fluids such as air or other gas, or water or other liquid can be introduced into the interior space 23 of the instrument. Fluid pressure inside the space 23 inside of the body causes the tubing 21 to be forced out the end of the instrument, for example, from positon 24 to position 25, etc.

If the nose piece 12 is introduced into a tubular body cavity, 26, having walls 26a (shown in cross section) for example, the outwardly moving tube 21 will extrude itself into the space available such as 27, and will then gently lift and spread the walls. By this process the tubing eventually is completely extruded and lines the walls 26a. However, in this process there is essentially no relative movement of the tubing with respect to the walls of the cavity in a longitudinal direction, and thus no irritation.

The diameter of the tubing 21 when extruded into the cavity and inflated with internal fluid pressure need not be great enough to fully extend the walls of the cavity. For example, if the body cavity were a man's throat, it would be dangerous to completely seal off the passage. In other cases, it might be desired to fully extend the walls of the cavity, either to close off the passage, or, for example, to contact the entire internal area of the cavity for treating purposes.

In FIGURE 1, I show that the end of the tubing 21 is tied to a cord 22 which passes out through the packing gland 14 to the outside of the body. When it is desired to withdraw the tubing 21 from the cavity, the cord 22 is pulled back while maintaining internal pressure in the space 23. By this means the entire tubing can be withdrawn without sliding contact against the cavity wall. As the cord 22 is withdrawn, retrieving the plastic tubing 21, fluid must be bled from space 23 to maintain proper pressure. Needle valve 28 is for this purpose.

Of course it is possible to deflate the tubing 21 completely, and collapse it to its smallest cross section and then to withdraw it from the cavity. This procedure may be followed where the cavity is large and there is no danger of injury to the tissues. In the withdrawal process it may be desirable to attach a pressure gauge 29 or other indicator to the space 23 as is well known in the art.

In FIGURE 2, I show the body 10 with a closed off end 30 instead of the packing gland cap 14. Inside of the space 23 is a small cylindrical reel or drum 32 with hub 31 and shaft 33. The shaft 33 is journaled in the walls of the body 10, and a knob or handle not shown is provided on the outside of the chamber by means of which the shaft 33 can be turned and the cord 22 wound up on the hub 31.

I have explained in connection with FIGURE 1 how it is possible to intrude into an elongated cavity a flexible thin-walled tubing, without sliding contact against the walls of the cavity. As it moves into the cavity it can accomplish one or more of at least six separate services.

(A) It can carry or pull into the cavity an instrument or other device. This will be further explained in connection with FIGURE 2.

(B) It can carry into the cavity a small bore rigid-walled flexible tubing to which a vacuum can be applied to withdraw fluids samples from the cavity. This will be illustrated and explained in connection with FIGURE 3.

(C) It can carry into the cavity space an instrument for visually observing the interior walls of the cavity. This is illustrated in FIGURE 4. In each of these three cases, the tubing 21 need not be of large bore, only large enough to carry inside of it the instruments or devices which are to be introduced into the cavity.

(D) The intruding tubing can be of large diameter (slightly larger than the diameter of the cavity) so that it will fully extend and contact the walls of the cavity. In so contacting the walls, it can medically treat the surface of the tissues by:

(a) Irradiation by radioactive materials embedded mechanically or chemically in or on the walls of the tubing, or in the fluid filling the tubing.

(b) By means of fluids within the tubing 21, which are allowed to flow through fine pores in the walls of the tubing, or by osmosis, to the outside, and contact the tissues.

(c) By means of chemical materials attached to or adhering to the outer surface of the inflated tubing 21 (or the inside surface of the non-inflated tubing) which can intimately contact the walls of the cavity.

Figure 5:
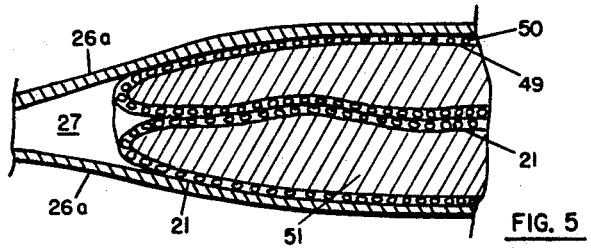
FIGURES 5 and 6 show in partial cross section further embodiments by means of which chemical or radiological treatment of the cavity can be accomplished.
Figure 6:
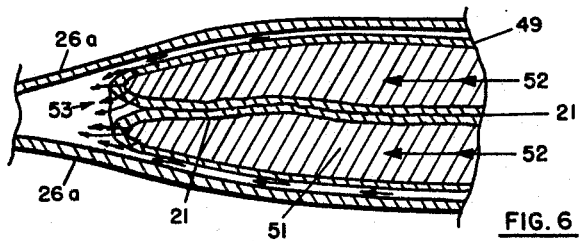
Figure 7:
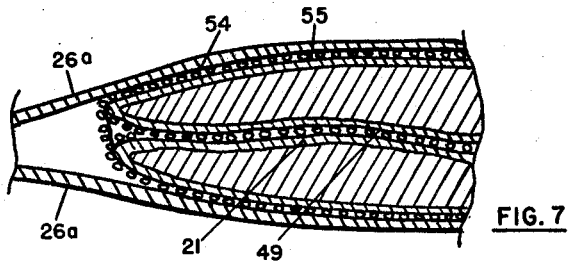
FIGURE 7 shows in partial cross section another embodiment adapted to facilitate the sampling of materials or fluids from the walls of the cavity and to indicate the precise location in the cavity from which they came.

These three modes of medical treatment of the walls of the cavity are illustrated respectively in FIGURES 5, 6, and 7.

(E) This intruded tubing can be used to withdraw samples of fluids or tissue fragments from the walls of the cavity, by making the outer surface of the inflated tubing sticky or tacky, or by covering it with porous absorbent material. This is also illustrated in FIGURE 7.

(F) It will clear that when the enlarged expanded tubing of FIGURES 5, 6, and 7 is fully intruded into the cavity, but without the retrievable cord 22, mechanical or electrical instruments can be inserted inside this plastic liner without contacting the tissues of the walls of the cavity.

Many other modifications and variations of these processes and devices might be devised in accordance with the basic principles of this invention discussed in connection with FIGURE 1.

In FIGURE 2, I show another embodiment of my invention. This shows the end 34 of the plastic tubing 21 overlapping the end 35 of rod 36, and fastened by means 39. The rod 36 is part of a capsule holder 37 in which can be placed some radioactive material for treating the tissue walls of the cavity. The other end of the capsule holder 37 has a ring 38 to which is fastened the retrieving cord 22. By making the length of the tubing 21 slightly longer than the depth of penetration desired for the capsule, the latter can be positioned anywhere within that length, and repositioned as many times as desired. In its movements the capsule holder slides inside of the plastic tubing without contacting the walls of the cavity, and so cannot injure the tissues. The position of the capsule, that is, its distance from the mouth of the cavity is measured by the length of the cord 22.

In FIGURE 3, I show another embodiment. Here the inside end 34 of the tubing 21 is extended over the end of a small bore thick-walled flexible tubing 40, and fastened by clamp 41. When the tubing 21 is fully extended out of the body 10, it folds back over the end 40a of the tubing tube 40 exposing the interior of this smaller tube to the space within the cavity. By applying a vacuum pump, aspirator, or similar device to the outside end 42 of the tube 40, fluids will be drawn into the tube and eventually will appear at 42. This embodiment is particularly useful for extracting fluids from the stomach. By this invention, the tube 40 is *drawn* into, or pulled into the stomach through the nasal or throat passages, instead of being *pushed* into them, with a consequent minimum of irritation and discomfort to the patient. The tube 40 should be rigid enough to withstand internal vacuum without collapsing, yet be flexible enough to bend around the twists and turns of the body cavity. All of these conditions are met by using a very small bore tube, one which would not be rigid enough to be *pushed* into the cavity. By pulling the tubing, instead of pushing, as is now customary in medicine, a much smaller bore tube can be used with reduced discomfort to the patient.

Once the small bore tube is pulled into the cavity and its end 40a is exposed to the cavity space, it is possible to introduce through this tube an instrument probe into the body cavity. This is especially useful when the cavity is a flexible walled space, and pressure in the tubing 21 is needed to support and spread the walls 26a of the cavity. Then as the tubing is retracted by maintaining pressure in the tubing 21 and withdrawing the tubing tube 40, the additional probe inside the tube 40 can be placed just beyond the end of the extended tubing 21, where the walls of the cavity are still supported and spread. This internal probe can be of any kind, such as electrical, mechanical, or optical, in use in the medical profession.

In FIGURE 4, I show another embodiment similar to that of FIGURE 3 except that instead of the tube 40 I show an optical device 43 comprising a bundle of microdiameter glass fibers. This is a new type of optical device which is used to "see around corners." An optical image presented at one end of the bundle is clearly visible at the other end, in spite of bends, twists, and turns of the fiber bundle. I show as an example, the bundle 43, with a short tube 44 extending beyond the end, to house optics 45. At the outer end of the bundle 43 is a housing 46, optics 47, and screen 48. The mechanical or optical design of the device itself is not part of this invention and is shown by way of example. Other types of optical probes can be used in this application.

The tubing 21 is slipped over the end of the tube 44 and locked by clamp 41. When the tubing 21 is fully extended the optics 45 will be exposed to the cavity and an image of what it sees will be shown on the screen 48.

In FIGURE 5, I show in partial cross section the extruded tubing 21 inflated and in contact with the walls 26a of the body cavity. In the material 49 that forms the walls of the tubing 21, there is embedded either mechanically or chemically, radioactive material shown schematically as particles 50. These are placed in close contact with the tissues and provide close range irradiation. This is useful where a large area of the cavity is to be irradiated. If a localized area is to be irradiated, the method of FIGURE 2 can be used, in which the radioactive material is placed in the capsule holder 37.

It is of course possible to use a liquid 51 to inflate the tubing 21 in which case the liquid can be used to carry the radioactive material as a soluble component of the liquid or as a mixture. With a liquid 51 used to inflate the tubing, it is also possible to make the tubing permeable to a small degree, not sufficient to prevent the build-up of pressure to inflate the tubing, and yet sufficient to permit the "bleeding" of liquid through the walls to contact the cavity tissues. This is illustrated in FIGURE 6 in which the plastic 49 is permeable and permits the fluid 51 flowing in accordance with the arrows 52 to flow through the tiny openings 53. By confining this porous plastic wall to a specific section of the tubing 21, the medication can be essentially confined to a specified portion of the cavity. If a large flow of liquid is desired, then a sizeable opening can be made in the wall of the tubing 21 at the proper distance from its end, so that when that portion of the tubing reaches the point of maximum insertion in the cavity the large opening will be exposed, and a large flow of fluid will take place from the inside of the inflated tubing to the cavity space.

In FIGURE 7, I show a similar embodiment in which the exterior surface 55 of the wall 49 of the plastic tubing 21 carries adhesive material 54 to make the surface sticky or tacky, so that as it contacts the walls 26a of the cavity it will pick up particles of tissue or other matter it comes in contact with. After the tubing 21 is inflated and pressed against the walls of the cavity, and contacts the removable particles, it can be withdrawn by maintaining fluid pressure inside the body 10 and retracting the tubing 21. Thus the tacky surface 54 and all the matter adhering thereto are enclosed in the inside of the tubing and so protected from rubbing and so destroying the material. After the tubing is retracted completely and removed from the cavity, it can again be extruded onto a table and will then show the complete surface in true distance relation within the body cavity. Then the adhering material can be examined and if desired, removed for further tests. It is possible also to coat the outside surface of the tubing with a porous powder 54 that will absorb fluids, such as blood, etc., from the walls of the cavity, and so will show the position of areas of bleeding.

It will be clear that once the tubing is extruded from the chamber and intruded into the cavity, it is possible to insert instruments of different types into the cavity through the tubing. This can be done without irritating the walls of the cavity, since the instruments will slide along the plastic which lines the walls. These instruments can be inserted through the chamber 10 while the fluid pressure is maintained inside the tubing 21. Or, by making the parts 11 and 12 easily removed from the main body of the chamber 10, the latter can be removed and the instruments introduced into the deflated tubing remaining inside the cavity. Or, if the small bore rigid wall tube 40 is used, the medical instruments or probes can be inserted through it, while the fluid pressure is maintained inside of the tubing 21.

The instruments that might be inserted can be of any type including electrical thermometer, electrical conductors for operating or measuring, electrical heating devices, electrical cooling devices (of the thermopile type), etc. These can also be introduced in the same manner as capsule holder 37 of FIGURE 2 is introduced. The electrical conductors, can, for example, be part of the cord 22.

If desired, while the casing 10 is attached to the tubing, and by providing a tube 40 similar to that of FIGURE 3, except that it is closed on the end 40a, and has an opening on the side 40b, the fluid pumped into the chamber through inlet 19 can be withdrawn through tube 40. Thus fluid can be circulated into and out of the tubing 21. This fluid can be of different temperature than that of the body to chill or heat the region of the cavity, or can differ in other ways from the characteristics of the cavity.

The inside end of the tubing 21 must be closed in order to hold pressure in the space 23. When used as in FIGURES 1 to 4, the end is permanently sealed against itself, or as in FIGURES 3 and 4, sealed around another device. When it is decided that instruments must be inserted through and beyond the end of the tubing 21 when it is fully intruded, a temporary seal of the tubing end is provided. This can be by means of a clip which can be attached to the cord 22 of fixed length, so that when the end of the tubing reaches the desired point, the clip is pulled off and the open end of the tubing permits entry of an instrument through the tubing and beyond it into the cavity.

If it is necessary to maintain pressure in the tubing 20 to keep the cavity walls apart, it is probably more practical to use the tube 40 and insert the probe into the cavity through it. In this way the tubing 21 can be withdrawn, as desired, by retrieving the tube 40 and continuing to scan or apply the probe to the full length of the cavity.

This invention permits the placement of a sampling or inspecting device within a long continuous cavity or tubular conduit that has many twists and bends whereas a rigid mechanical device could not be introduced, and a thin flexible device could not be "pushed" into the cavity.

In the preparation of the tubing 21 with an interior coating of chemicals, adhesive, porous absorbing material, or the like, there are two principal methods. One is to use a plain tubing, extrude it through an opening in a chamber (turning its original inside surface-out) much like in the process of this invention, coating the surface thus exposed, with chemical, adhesive, or other material, and retrieving the tubing (while turning it outside-in). The second way is to prepare a strip of heat sealable plastic material of width approximately equal to the circumference of the desired tubing, coating one surface of this tubing with the desired materials, folding the strip along its center line (with the coated surface inside), and heat sealing the two adjacent edges to form a tube.

In FIGURE 8 is shown an embodiment of this invention in which the casing comprises a tube 80. In a first end of the tube is inserted a moveable piston 84 sealed by resilient means 85 to the tube. The piston rod 86 forms a handle by means of which the piston can be forced into and withdrawn out of the tube 80. A length of flexible, thin-walled tubing or sleeve 81 is closed at one end 83 and attached to the piston 84. The other end of the sleeve 81 is sealed circumferentially over the second end of the tube by clamp means 82. The casing is filled with fluid in the annular space between the tube 80 and the sleeve 81, by means shown schematically as the needle 88. Withdrawal of the needle seals the opening in the tube and leaves the casing filled with fluid. Means such as shown in FIGURE 1 for filling the casing with fluid and maintaining the fluid in the casing can be used.

Now as the piston 84 is moved to the left, into the tube 80, it reduces the volume of fluid in the tube, forcing the fluid out of the tube into the sleeve 81 causing the sleeve to evert and to be extraverted out of the end of the tube. When the piston 84 has reached the position 84' the sleeve 81 will have been extraverted to the position 81' and so on. When the piston 84 is withdrawn to the right, fluid is withdrawn from the sleeve 81' causing it to invert and be introverted back into the tube 80. The movement of the sleeve 81 into the tube is aided by the attachment of the end 83 of the sleeve to the piston.

It will be clear by referring to FIGURES 1 and 4, that the rod 22 and the cylindrical optical device 43, sliding through their respective pressure seals 16, act as pistons in precisely the same manner as the piston 84. However, being of smaller diameter than the tube 10, they do not displace as much fluid for each unit length of insertion as does piston 84. However, when either the rod 22 or optical device 43 are forced into the tube 10, fluid is forced from the tube into the tubing or sleeve 21, causing it to evert and be extraverted from the tube 10. The action of the piston 22 or 43 corresponds to a reentrant portion of the casing being inserted into the fluid space. The tube 10 plus this reentrant portion corresponds in action to an inverted tube, and an inverted tube may be substituted for the tube 10 plus reentrant piston.

In FIGURES 9, 10 and 11 are shown partial crosssections of the probe or tubing. In the preparation of a tubing having adhesive on the inside surface, it would be difficult to event the tubing, simply due to the tension of the adhesive. It is possible to encapsulate the adhesive (which preferably is a non-drying tackey adhesive) in small spheres 91 of water soluble material (such as, for example, polyvinyl alcohol) and attach them to the surface of the tubing 90 by cement or similar means. Thus, the adhesive would not be tackey until after eversion, and after contact of the capsules with the wall of the cavity, where body fluids would dissolve the coating of the capsules and expose the adhesive.

Another way of accomplishing this is to provide, as in FIGURE 10, a layer of adhesive 93 on the tubing 92. The outer surface of the adhesive 93 is covered by a thin layer 94 of water soluble material. This could be a film, as shown, or a powder, etc.

In FIGURE 11 is shown a section of tubing 95, in which are embedded a plurality of small granules, particles or powder of high density material, 96. This material can be a metal powder or ground minerals, etc. The purpose of this powder is to provide absorption when the probe is exposed to X-rays, so the probe will cast a shadow, and its position and size can be determined, and thus the location of the walls, and dimensions of the cavity in which it is placed can be determined. Instead of placing the dense particles inside of the material of the tubing as in FIGURE 11, they can be placed on the surface, by cementing or otherwise fastening them in position, as in FIGURE 9 where numeral 91 now refers to the particles of radiopaque material.

Of course, if the material 96 is a radioactive mineral, the tubing would not only be radiopaque, but could also serve to treat the walls of the cavity by irradiation.

This invention is susceptible to a wide variety of embodiments, some of which have been described, and many more of which will be obvious to one trained in the art, and is not to be construed as to be limited to the specific apparatus described above. The scope of this invention should be construed to be limited only by the scope of the appended claims.

I claim:

1. Apparatus for removably placing a long, flexible fluid impervious eversible probe into an elongated cavity, comprising a fluid tight non-expandable non-eversible tube, movable non-deformable fluid displacing cylindrical means, means to seal said cylindrical means into a first end of said tube, eversible probe means in said tube, one end of said probe closed, the other end of said probe sealed across the second end of said tube, said cylindrical means and said sealing means adapted to completely close off said first end of said first tube against fluid flow out of said first end, and means to fill said tube with fluid, said tube filled with fluid at atmospheric pressure, whereby when said cylindrical means is pressed axially inward into said tube at said one end, said probe will be everted from the other end of said tube by fluid displaced by said cylindrical means.

2. Apparatus as in claim 1 in which said cylindrical means is of such diameter as to substantially fill the cross-section of said tube.

3. Apparatus as in claim 1 in which said cylindrical means is of smaller diameter than the diameter of said tube.

4. Insertable means adapted for insertion into an elongated constricted space, comprising a first non-eversible sleeve and a second eversible sleeve constructed of fluid impervious material, said eversible sleeve inside of said non-eversible sleeve, one end of said eversible sleeve closed and the other end sealed over a first end of said non-eversible sleeve, movable non-deformable cylindrical fluid-displacing means inserted into the second end of said non-eversible sleeve and flexible means for sealing said cylindrical means into the second end of said non-eversible sleeve, said non-eversible sleeve filled with fluid at atmospheric pressure, whereby when said cylindrical means is pressed axially inward, from said second end of said non-eversible sleeve fluid will be forced from the first of said sleeves into the second of said sleeves, thereby causing the second of said sleeves to evert.

5. Apparatus for everting a flexible eversible probe comprising:
a non-eversible tube,
a flexible eversible tubular probe inside of said tube, one end of said probe means sealed across a first end of said tube,
movable, substantially incompressible, fluid-displacing cylindrical means inserted into the second end of said tube and means to seal said cylindrical means into the second end of said tube, said cylindrical means and said sealing means closing off substantially the entire cross section of said tube,
said cylindrical means inserted into said probe means, and
said tube filled with fluid at atmospheric pressure,
whereby when said cylindrical means is pressed axially inward into said tube at said second end, fluid will be displaced by said cylindrical means from said tube into said probe, and said probe will be everted from the first end of said tube.

6. Apparatus as in claim 5 in which said cylindrical means is sealed into said tube by resilient means placed in the annular passage between said cylindrical means and said tube.

7. Apparatus as in claim 5 in which said cylindrical means is sealed into said tube by deformable means adapted to prevent fluid flow out of said tube through the annular passage between said cylindrical means and said tube.

8. Apparatus as in claim 5 in which cylindrical means comprises non-deformable elongated tubular means.

9. In a method for removably inserting an elongated flexible eversible probe into an elongated constricted space, in which said probe is inserted into a non-expandable, non-eversible, fluid-impervious tube with a first end of said probe sealed circumferentially across said first end of said tube, the second end of said probe closed, longitudinally movable closure means sealed into the second end of said tube and said tube filled with fluid, the method of inserting said probe into said space comprising the steps of:
(a) placing the first end of said tube at the mouth of said constricted space,
(b) moving said closure means along said tube toward said first end of said tube, whereby fluid displaced by said closure means will evert said probe into said space.

10. A probe means for use in a medical instrument into a chamber of which it is placed through an opening in said chamber, to which it is sealed circumferentially over said opening, and from which it is everted by fluid means in said chamber into a body cavity, said probe comprising:
(a) a flexible thin-walled eversible tubing, one end having closure means, the other end adapted to be sealed over said opening,
(b) at least a portion of one surface of said tubing coated with microcapsules of non-drying tackey adhesive encapsulated in a water soluble material, whereby when said probe is everted into said cavity, said water soluble material will be dissolved in body fluids in said cavity, exposing said adhesive.

11. A probe means for use in a medical instrument into a chamber of which it is placed through an opening in said chamber, to which it is sealed circumferentially over said opening, and from which it is everted by fluid means in said chamber into a body cavity, said probe comprising:
(a) a flexible, thin-walled, eversible tubing, one end having closure means, the other end adapted to be sealed over said opening,
(b) at least a portion of one surface of said tubing coated with non-drying tackey adhesive,
(c) a thin layer of non-adhesive, water-soluble material covering said adhesive, whereby when said probe is everted into said cavity said water soluble material will be dissolved in body fluids in said cavity exposing said adhesive.

12. A probe means for use in a medical instrument into a chamber of which it is placed through the opening in said chamber, to which it is sealed circumferentially over said opening, and from which it is everted by fluid means in said chamber into a body cavity, said probe comprising:
(a) a flexible, thin-walled, eversible tubing one end having closure means, the other end adapted to be sealed over said opening,
(b) at least a portion of one surface of said tubing coated with a layer of small particles of dense radiopaque material.

13. Apparatus for removably placing a long, flexible, fluid-impervious, eversible probe into an elongated cavity, comprising: a fluid-tight, non-expandable, non-eversible tube; movable, non-deformable, fluid-displacing, cylindrical means sealed into a first end of said tube; eversible probe means in said tube; one end of said probe closed, the other end of said probe sealed across the second end of said tube; means for filling said tube with fluid; said cylindrical means of such diameter as to substantially fill the cross-section of said tube, whereby when said cylindrical means is pressed inward into said tube at said first end, said probe will be everted from said second end of said tube by cylindrical means-displaced fluid.

14. The method as in claim 9 including the additional steps of:
(c) leaving said probe in said space for a predetermined period of time, and
(d) moving said closure means back toward the second end of said tube, whereby fluid will be withdrawn from said probe, causing said probe to invert and be withdrawn from said cavity into said tube.

15. The method as in claim 9 including the additional steps of:
(c) leaving said probe in said space for a predetermined period of time,
(d) moving said closure means back toward the second end of said tube, whereby fluid will be withdrawn from said probe back into said tube, and said probe will be deflated, and
(e) removing said deflated probe from said space.

16. The method as in claim 9 in which the closed end of said probe is attached to the movable closure means, and including the additional steps of:

(c) leaving said probe in said space for a predetermined length of time, and (d) moving said closure means back toward the second end of said tube, whereby fluid will be withdrawn from said tube and simultaneously the closed end of said probe will be drawn back into said tube causing said probe to be withdrawn from said space.

17. In a method for inserting a flexible eversible probe into an elongated constricted space in which said probe is inserted into a non-expandable, fluid-impervious tube, the second end of said tube closed, one end of said probe closed, the other end of said probe sealed across the first end of said tube, substantially rigid cylindrical fluid displacing means inserted into the second end of said tube and sealed into the second end of said tube, said tube filled with fluid, the method of inserting said probe into said space comprising the steps of:

(a) placing the first end of said tube at the mouth of said constricted space, and (b) pressing said cylindrical means farther into said second end of said tube, whereby fluid will be displaced from said tube causing said probe to be everted from said tube into said space.

18. The method as in claim 17 including the additional steps of:

(c) leaving said probe in said space for a predetermined period of time, and (d) withdrawing said cylindrical means along said tube to cause fluid to be transferred from said probe back into said tube, whereby said probe will be collapsed and can be withdrawn from said space.

19. Apparatus for removably placing a long, flexible, eversible probe into an elongated cavity, comprising:

(a) a fluid-tight, non-expandable, non-eversible tube, (b) said probe means inside said tube, the inner end closed, the outer end sealed over a first end of said tube, (c) movable, fluid-displacing means inserted and sealed into the second end of said tube, (d) means external to said tube for moving said fluid-displacing means axially along said tube, and (e) means for filling said tube with fluid, said tube filled with fluid at atmospheric pressure, whereby when said fluid-displacing means is moved toward the first end of said tube, fluid will be displaced from said tube causing said probe to be everted out of said first end.

20. Apparatus for removably placing a long, flexible, eversible probe into an elongated cavity comprising:

(a) a fluid tight, non-expandable, non-eversible tube, (b) said probe means inside said tube, the inner end closed, the outer end sealed circumferentially over a first end of said tube, (c) longitudinally movable closure means inside said tube and sealing the second end of said tube, and means external to said tube for moving said closure means axially along said tube, and (d) means for filling said tube with fluid, said tube filled with fluid at atmospheric pressure, whereby as said closure means is moved toward said first end, fluid will be displaced along said tube forcing said tube out of said first end, and causing said tubing to evert.

21. Apparatus as in claim 20 in which said longitudinally movable closure means comprises non-deformable cylindrical means inserted into said second end and flexible sealing means sealed across the annular space between said cylindrical means and said second end, to completely close off said second end.

22. Apparatus as in claim 21 in which said cylindrical means is inserted into the inner end of said probe means.

23. Apparatus as in claim 20 in which said longitudinally movable closure means comprises non-deformable cylindrical means inserted into said second end, and flexible means sealing said cylindrical means into said second end, said cylindrical means and said sealing means adapted to completely close off said second end against fluid flow out of said second end.

References Cited

UNITED STATES PATENTS

| 2,988,461 | 6/1961 | Eichel | 117—122 |
| 3,132,062 | 5/1964 | Lang et al. | 156—287 |

FOREIGN PATENTS 415,482  11/1925  Germany.

DALTON L. TRULUCK, Primary Examiner

U.S. Cl. X.R.

128—262, 348; 156—294